Figure 1:
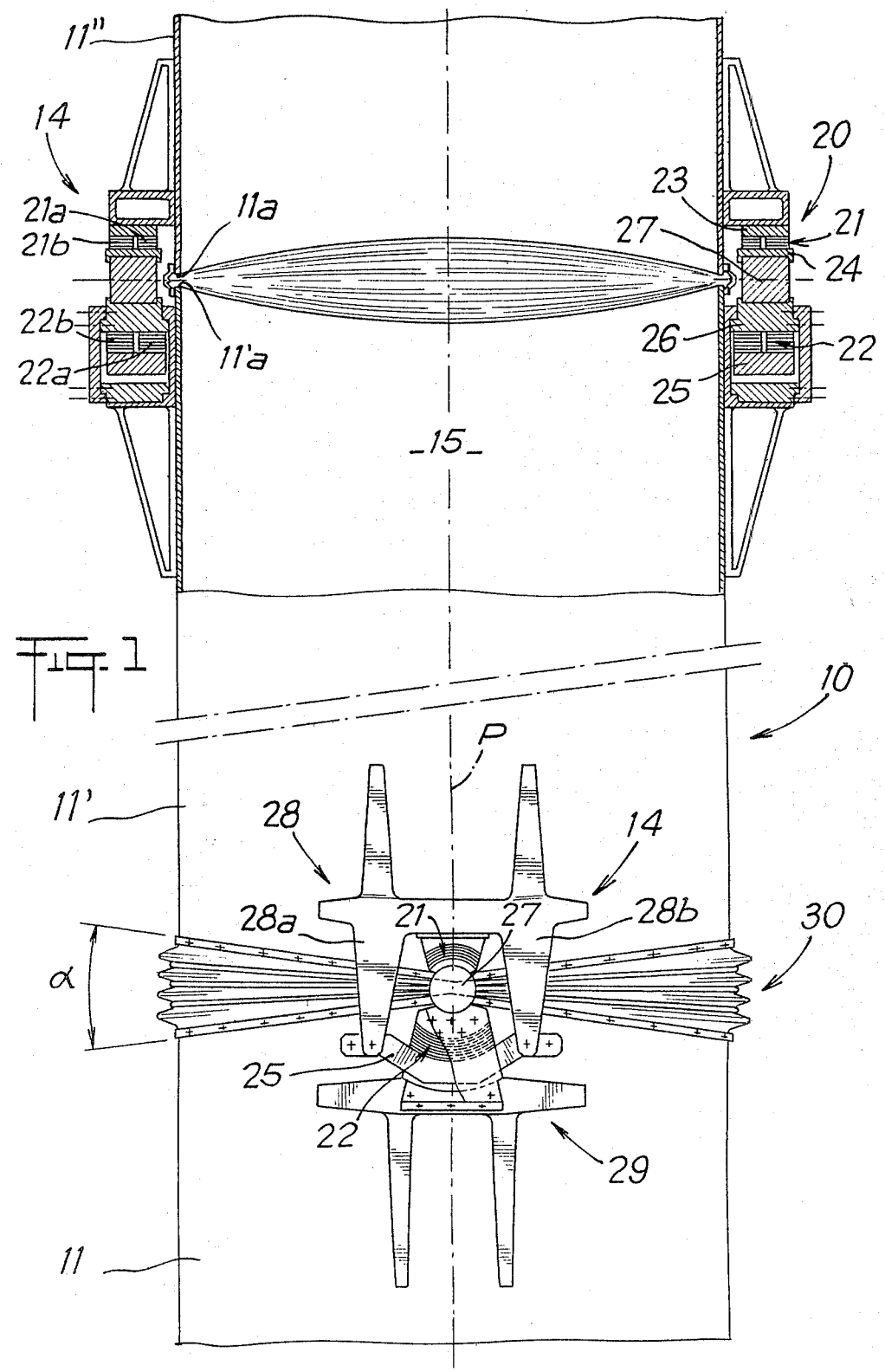

United States Patent [19]

Clebant

[11] 4,406,482
[45] Sep. 27, 1983

[54] ARTICULATED PIPE LINE

[75] Inventor: Jean-Claude Clebant, Carbon-Blanc, France

[73] Assignee: Societe Europeenne De Propulsion, Puteaux, France

[21] Appl. No.: 226,555

[22] Filed: Jan. 21, 1981

[30] Foreign Application Priority Data

Jan. 24, 1980 [FR] France ............................... 80 01535

[51] Int. Cl.³ ........................................... F16L 27/00
[52] U.S. Cl. .................................. 285/114; 285/223; 285/226; 285/264; 285/DIG. 19
[58] Field of Search ............... 285/226, 227, 229, 114, 285/223, 264, DIG. 19

[56] References Cited

U.S. PATENT DOCUMENTS

| | | | |
|---|---|---|---|
| 1,153,187 | 9/1915 | Berry | 285/114 X |
| 2,551,550 | 5/1951 | Smith | 285/264 |
| 2,590,392 | 3/1952 | Feilden | 285/90 |
| 4,068,868 | 1/1978 | Ohrt | 285/263 |

FOREIGN PATENT DOCUMENTS

| | | |
|---|---|---|
| 1811959 | 7/1978 | Fed. Rep. of Germany ...... 285/226 |
| 1236037 | 6/1960 | France . |
| 2229011 | 12/1974 | France . |
| 2347602 | 11/1977 | France . |
| 806266 | 12/1958 | United Kingdom . |

Primary Examiner—Thomas F. Callaghan
Attorney, Agent, or Firm—DeLio & Libert

[57] ABSTRACT

An articulated pipe line comprising rigid sections jointed together so as to allow a limited angular movement between adjacent sections, the axis of two successive articulations having different directions and a sealing device ensuring a tight separation between the outside and the inside of the pipe line at the level of the articulation. This device is particularly suitable for immersed pipe lines of large diameter.

9 Claims, 12 Drawing Figures

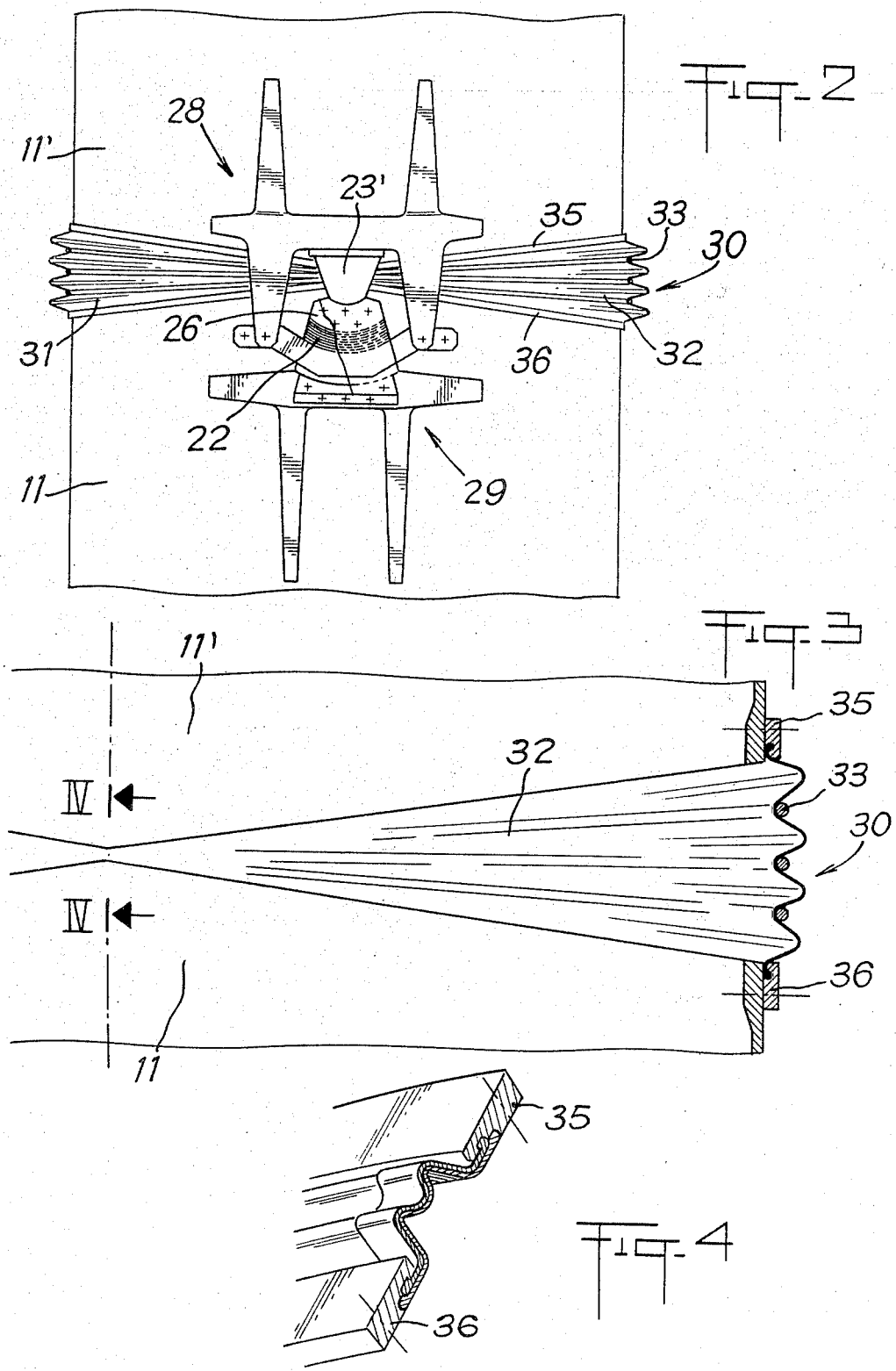

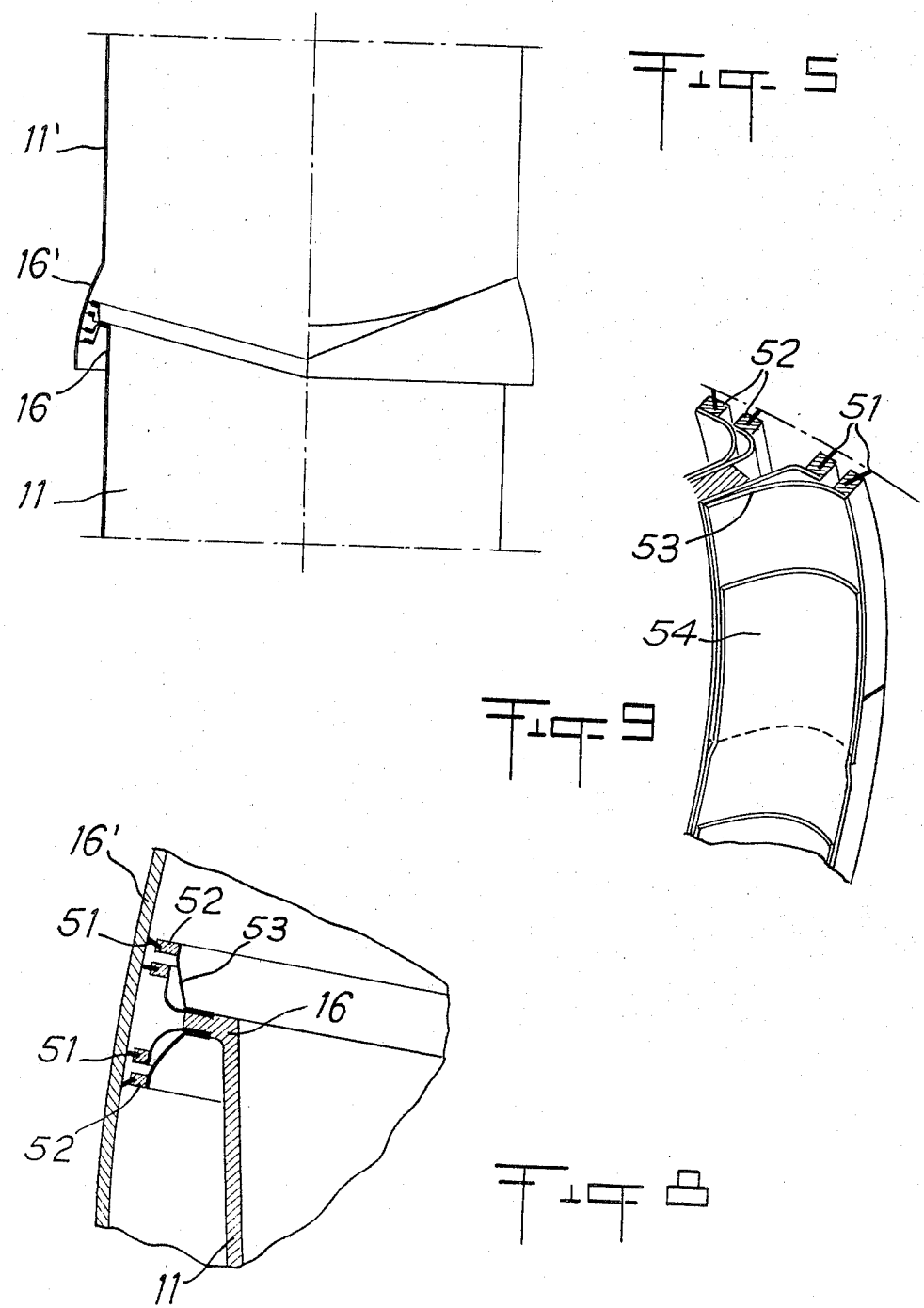

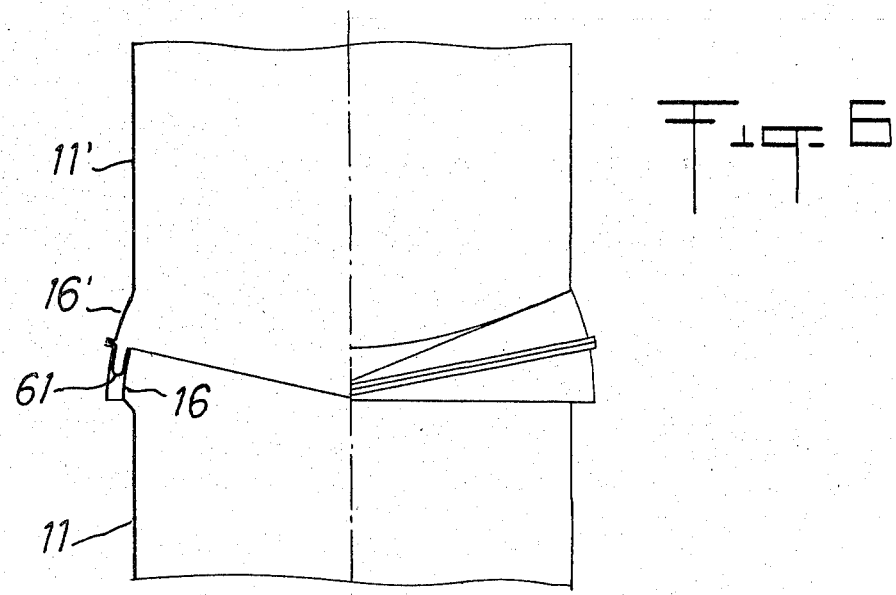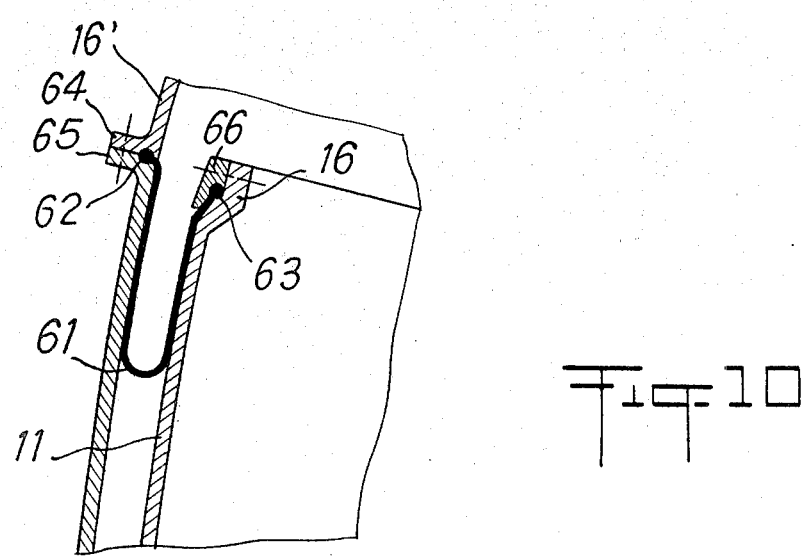

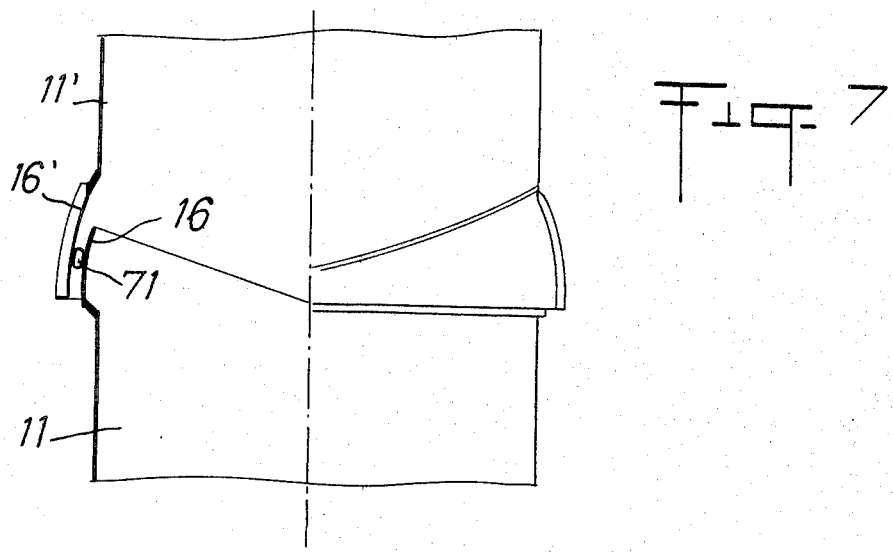
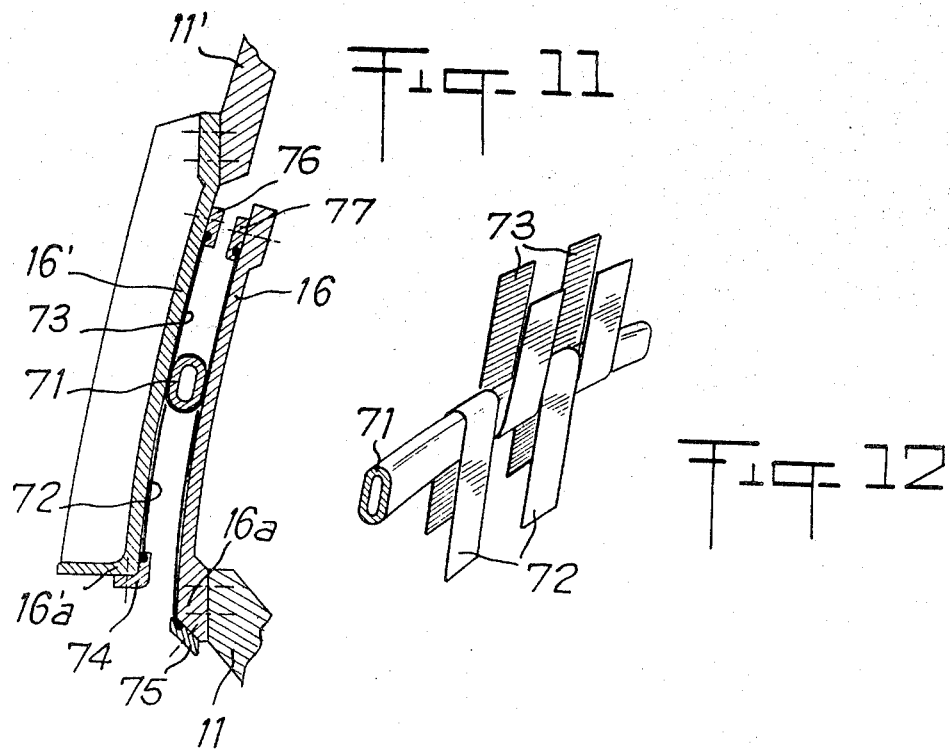

ARTICULATED PIPE LINE

The present invention relates to an articulated pipe line and more particularly to a pipe line of the type comprising rigid sections jointed together so as to allow a limited angular movement between adjacent sections, the axes of two successive articulations having different directions, and a sealing device ensuring a tight separation between the inside and the outside of the pipe line at the level of the articulation.

The field covered by the present invention is more particularly but not exclusively that of pipe lines designed to be immersed at relatively great depths (several hundreds meters), such as for example pipe lines of large diameter (several meters) usable for taking cold sea water for thermal power stations which make use of the difference between the temperature of the water situated on the surface of the sea and that of deep down water.

Very long immersed pipe lines need to be articulated in order to limit the bending stresses which are due to marine currents. The connections between the sections of pipe should fulfill the following functions:

achieve a longitudinal transmission of the stresses;

allow sufficient relative angular movement between adjacent pipe sections, without any strain at the level of the joint, as the angular movement can frequently reach maximum amplitude;

ensure a simple seal at the level of the articulations; and limit the propagation of shock and vibrations which can cause damages to the articulations.

Several solutions have already been proposed to solve some of these problems, but they have been mostly considered for pipe lines of relatively small sizes and to extend them to larger size pipe lines is not always possible.

For example, it was proposed in U.S. Pat. No. 4,068,868 to produce flexible joints for a column pipe in a system of underwater drilling by using stacks of alternated layers of elastomer and metal arranged according to concentric spherical surfaces.

This solution becomes impracticable when the diameter of the pipe line increases to a large size, because for a given maximum angular clearance, the thickness of the stack is proportional to the mean radius of the spherical layers.

It could be envisaged then to build the articulations in the vicinity of the axis of the pipe line. But this would lead to important obstacles being created all along the pipe line.

U.S. Pat. No. 2,590,392 and British Pat. No. 806 266 propose the combination of a fork and of circular bellows to allow, by simple means, an angular movement about a preferential axis of rotation. The pipe lines involved are designed to convey pressurized fluid which makes it necessary to use sufficiently rigid bellows showing enough bending and tensile strength to transmit, on the one hand, the bending stresses, and on the other hand, the vibrations. Moreover, the cylindrical shape of the bellows do not readily lend themselves to angular movements, even small ones, especially with large size bellows.

The use of bellows made of elastic material is recommended in French application No. 2347 602 for relatively small pipe lines, in combination with forks. The transmission of shocks remains possible through the forks, and the circular bellows becomes impractical to use as the diameter increases.

It is therefore the object of the present invention to propose an articulated pipe line of the type indicated at the start of the description, which can have a large diameter, i.e. a diameter greater than about 1 meter, without insuperable construction problems arising, without obstacles being created inside the pipe line, and without any shocks or vibrations being transmitted.

This object is reached due to the fact that, according to the invention, each articulation comprises a flexible joint device with two diametrically opposite cylindrical bearings, which uses elements constituted by the stacking up of alternated layers of an elastic material and of a rigid material, and allows a rotation about an axis which is perpendicular to the axis of the pipe sections situated on either sides of the articulation, and the sealing and flexible joint devices for each articulation are placed on the outside of a passage situated in prolongation of the internal passages of the two pipe sections joined by the said articulation, so as to retain throughout the pipe line a free passage section which is at least equal to that of each pipe section.

According to a special feature of the pipe line according to the invention, each cylindrical bearing comprises a modular assembly of blocks, each constituted by a stack of alternated layers of an elastic material and of a rigid material.

Due to the fact that each articulation only has one degree of rotation, the associated sealing device can be produced relatively simply.

For example, according to a first embodiment of the pipe line according to the invention, each articulation is provided with a bellows-type sealing device, the closing and opening movements of which bellows are performed about an axis which vritually coincides with that of the articulation.

According to another embodiment of the invention, the sealing device is housed in the space between the inner surface of the flared end of a first section of pipe and the outer surface of the end portion adjacent to the next section of pipe which is surrounded by the said flared end. The sealing device can then consist in a supple annular membrane whose edges are fixed on the next sections of pipe or it can comprise annular scraping segments which are pressed against the inner flared surface of the first section of pipe and borne by supports connected to the other section of pipe by means of elastically pulled connecting parts. It is also advantageously possible to use an O-ring capable of rolling over concentric spherical surfaces defining the interval between the adjacent ends of adjacent sections of pipes.

The invention will be more readily understood on reading the following description with reference to the accompanying drawings, in which:

FIG. 1 is a partial axial cross-section of an elevational view of part of a pipe line according to the invention, FIG. 2 is an elevational view of a variant embodiment of a cylindrical bearing in a pipe line articulation according to the invention, FIG. 3 is a detailed view on an enlarged scale showing part of the sealing device in the pipe articulation illustrated in FIG. 1, FIG. 4 is a cross-sectional view along line IV—IV of FIG. 3, FIGS. 5 to 7 are three elevational views of semi-cross-sections showing three other embodiments of the sealing device in a pipe line articulation according to the invention.

FIGS. 8 and 9 are two detailed views showing on an enlarged scale, a cross-section and a perspective respectively, of part of the sealing device illustrated in FIG. 5, FIG. 10 is a detailed view showing on an enlarged scale a cross-section of part of the sealing device illustrated in FIG. 6, and, FIGS. 11 and 12 are respectively, detailed cross-sectional and perspective views, respectively, showing on an enlarged scale parts of the sealing device illustrated in FIG. 7.

The pipe line 10 illustrated in FIG. 1 is made up of identical pipe sections 11, 11', 11'', . . . , joined end-to-end by articulations 14. Each articulation allows a rotation about only one axis perpendicular to the axes of the pipe sections connected by the said articulation. The axes of the articulations situated at the two ends of one pipe section are offset by 90° one with respect to the other.

As shown in FIG. 1, the adjacent ends of two adjacent pipe sections, such as for example 11, 11', are bevelled and form dihedrons whose edges, 11a, 11'a, are parallel to the axis of articulation. Thus, on each side of the middle longitudinal plane P which contains the articulation axis, the parts facing the ends of the pipe sections 11, 11' are contained in planes forming together an angle α which limits the angular clearance possible between the pipe sections.

The elements constituting each articulation are situated on the outside of the passage 15 which extends inside the pipe sections joined together by the said articulation. Thus, the pipe line 10 comprises over its entire length a free passage section which is at least equal to that of each pipe section.

The different articulations 14 have identical structures. Each one comprises two identical cylindrical bearings 20, which are co-axial and diametrically opposite, and a sealing device 30 separating in tight manner the inside of the pipe line from the outside, at the level of the articulation.

Each bearing 20 comprises flexible joint elements 21, 22 situated on either sides of the axis of articulation and made up, in known manner, by stacks of alternated layers of elastomer and metal.

The layers in the elements 21, 22, are arranged according to co-axial surfaces, the common axis being the axis of articulation. Each element 21, 22 extends over an angular sector smaller than 180° and can be of modular construction, i.e. formed by juxtaposed identical blocks. Thus, as shown in FIG. 2, the elements 21 and 22 are each made up of two identical parts 21a–21b, 22a–22b, aligned in parallel to the axis of the bearing. Moreover, if the dimensions of the bearing require it, each one of these parts can be made up of several identical parts occupying each a fraction of the total angular sector occupied by an element 21, 22.

The flexible element 21 is housed between two parts 23, 24 to which are fixed the end layers of the said element. In the same way, the flexible element 22 is housed between two parts 25, 26. The joining together and to the parts between which they are housed of the layers of elements 21, 22 can be achieved by vulcanization in situ of the elastomer.

The parts 24, 26 have two cylindrical external surfaces which rest against two diametrically opposite zones of a cylindrical core 27 whose axis is the axis of articulation.

The part 23 is borne by a support 28 fitted on the external surface of a pipe section such as 11' for example.

The support 28 comprises a U-shaped portion with two branches 28a, 28b situated on either side of the plane P, oriented substantially in parallel to the axis of the pipe line in the direction of the pipe section 11 and between which are placed the flexible elements 21 and 22, the part 23 being fixed to the bottom of the said U. At the ends of the branches 28a, 28b are connected the end portions of the part 25 between which said latter rests on the elements 22. The part 25 passes between two branches of a U-shaped support part 29 supporting the part 26 and fixed on the external surface of the pipe section 11.

In this way, the joining elements 21, 22 allow, by their deformation, a limited angular clearance between the pipe section 11 and 11'. As to the longitudinal stresses between the pipe sections 11 and 11', these are transmitted, in pulling, successively by the parts 29, 26, 22, 25 and 28 and, in compression, successively by the parts 26, 27, 24, 21, 23 and 28.

The flexible element 21 plays some part in the articulation function between the pipe section 11 and 11' but it is not absolutely necessary. Therefore, as a variant, it will be possible to produce a "single effect" bearing with only the flexible element 22, the parts 23, 21 and 24 being replaced by a cylindrical bearing 23' fixed on the support 28 (FIG. 2) and on which rests the part 26.

The sealing device 30, singled out in more details, in FIGS. 3 and 4 is of the bellows type.

The tightness at the level of each articulation, for example between the two pipe sections 11 and 11' is achieved by means of two identical bellows 31, 32 diametrically opposite, on either side of the plane P.

Each bellows can fold up or expand about an axis which coincides practically with the axis of articulation. The folds of the bellows 31, 32 are provided on the outside with retaining rings 33 placed along the hollows of these folds.

Metal strips 35, 36 are secured over the outer surface of pipe-sections 11, 11', along their opposite edges and tie in tight manner the edges of the bellows 31, 32 to the pipe-section. These edges are provided with beaded portion clamped between the strips 35, 36 and the outer surface of the sections 11, 11'.

As shown in FIG. 4, the bellows 31, 32 overlap in the zone where they join up at the level of the axis of articulation.

Other embodiments of sealing devices can be used and are described hereinafter with reference to FIGS. 5 to 10 which for clarity's sake, only show the sealing devices for the articulations.

For example, as shown in FIGS. 5 to 7, the sealing device can be fitted in the space between one end 16 of a first pipe section, 11 for example, and a flared out portion 16' forming a spherical skirt situated at the end of the pipe section 11' adjacent to the pipe section 11 and surrounding the end portion 16 of the latter.

In the case of the embodiment illustrated in FIGS. 5, 8 and 9, the tightness is obtained by means of a plurality of annular scraping segments 51, numbering four for example. Each segment is borne by an annular support 52 connected to the end 16 of the pipe section 11 via a strip 53 composed of plates 54 assembled together. As shown in FIG. 8, two adjacent plates overlap over a distance at least equal to half their length. The plates 54 are screwed along their edges on the edge of the end 16 and on the annular support 52, which latter can be made up of several parts placed end-to-end. The plates 54 are made of metal and elastically deformed when assembled in order to apply the segments 51 with pressure against the inside surface of the skirt 16′.

Said skirt 16′ is placed and sized so that the segments 51 remain in permanent contact therewith in all the possible relative positions between the pipe sections 11 and 11′.

In the case of the embodiment shown in FIGS. 6 and 10, tightness is ensured by an annular membrane 61 whose edges 62, 63 are fixed respectively on the skirt 16′ and on the end 16 of the pipe section 11. The edge 62 is provided with a beaded portion clamped for example between two annular pieces 64, 65, fixed together and constituting the skirt 16′. The edge 63 is provided with a beaded portion clamped between the external surface of the end 16 and a clamping ring 66.

Finally, according to an advantageous embodiment, the sealing device is of the type with rolling joint as illustrated in FIGS. 7, 11 and 12.

The end 16 of the pipe section 11 is constituted by an added piece whose external spherical surface is concentric with the inner surface of the skirt 16′ and is situated opposite the latter. An O-ring 71 is provided between these surfaces. Said O-ring is composed for example of a hollow ring in reinforced elastomer and filled with liquid. Said O-ring is compressed between the skirt 16′ and the end 16. When the pipe sections 11 and 11′ bend one with respect to the other, the O-ring 71 rolls over the surfaces between which it is mounted.

A plurality of strips 72, 73 are placed between the skirt 16′ and the end portion 16 all around the axis of the pipe line.

The strips 72 are secured at their ends along the opposite edges 16′a, 16a of the skirt 16′ and of the part 16, which edges are on the side of the pipe section 11. The fastening is achieved by means of a clamping ring 74, 75 which compress the beaded ends of the strips 72. Each strip 72 passes over the rolling joint 71 between its ends.

Likewise, clamping rings 76, 77 secure the ends of the strips 73 along the opposite edges of the skirt 16′ and of the part 16, which edges are situated on the pipe section 11′ side. Between its ends, each strip 73 passes over the rolling joint 71.

As shown in FIG. 12, the rolling joint 71 is held over its entire length by the strips 72, 73 arranged in alternated manner. Thus, when the pipe sections 11, 11′ pivot one with respect to the other, pulling forces are exerted on the strips 72, 73, which latter force the joint 71 to roll between the surfaces against which it is resting.

The invention is not limited to the embodiments described hereinabove but on the contrary covers any modifications or additions that may be brought thereto without departing from the scope thereof.

What is claimed is:

1. Articulated pipe line of large diameter comprising: rigid sections jointed together by articulation allowing a limited angular movement between adjacent sections, the axes of two successive articulations having different directions, and a sealing device ensuring a tight separation between the inside and the outside of the pipe line at the level of the articulation wherein each articulation comprises a flexible joint device with two diametrically opposite cylindrical bearings, including elements constituted by the stacking up of alternated layers of an elastic material and of a rigid material, and allowing a rotation about an axis which is perpendicular to the axis of the pipe sections situated on either sides of the articulation; and the sealing and flexible joint devices for each articulation are placed on the outside of a passage situated in prolongation of the internal passages of the two pipe sections joined by the said articulation, so as to retain throughout the pipe line a free passage section which is at least equal to that of each pipe section.

2. Articulated pipe line as claimed in claim 1, wherein each cylindrical bearing comprises a modular assembly of blocks, each constituted by a stack of alternated layers of an elastic material and of a rigid material.

3. Articulated pipe line as claimed in claim 1, wherein each articulation is provided with a bellows-type sealing device, the closing and opening movements of which bellows are performed about an axis which virtually coincides with that of the articulation.

4. Articulated pipe line as claimed in claim 1, wherein the sealing device is housed in the space between the inner surface of the flared end of a first section of pipe and the outer surface of the end adjacent to the next section of pipe which is surrounded by the said flared end.

5. Articulated pipe line as claimed in claim 4, wherein the said sealing device comprises annular scraping segments which are pressed against the inner flared surface of the first section of pipe and borne by supports connected to the other section of pipe by means of elastically pulled connecting parts.

6. Articulated pipe line as claimed in claim 4, wherein the sealing device comprises a supple annular membrane whose edges are fixed on the next sections of pipe.

7. Articulated pipe line as claimed in claim 4, wherein the said inner and outer surfaces are concentric spherical surfaces and the sealing device comprises an O-ring adapted to roll over the said surfaces.

8. Articulated pipe line as claimed in claim 7, wherein the O-ring is held in position by strips secured at their ends on the two pipe sections and passing over the said joint between their ends.

9. Articulated pipe line as claimed in claim 8, wherein the said O-ring is held in position over its entire length alternately by first strips whose ends are secured on the pipe sections substantially at the level of the end of one of the pipe section and by second strips whose ends are secured to the pipe sections substantially at the level of the end of the other pipe section.

* * * * *